(12) United States Patent
Brönner et al.

(10) Patent No.: US 7,222,918 B2
(45) Date of Patent: May 29, 2007

(54) FORWARDLY MOVABLE VEHICLE SEAT WITH AN UNDERFRAME AND A FORWARDLY FOLDABLE SEAT BACK

(75) Inventors: Martin Brönner, Lohr a. Main St. Pflochsbach (DE); Wilfried Beneker, Leichlingen (DE); Reinhard Vogel, Erkrath (DE)

(73) Assignee: C. Rob Hammerstein GmbH & Co. KG (DE)

( * ) Notice: Subject to any disclaimer, the term of this patent is extended or adjusted under 35 U.S.C. 154(b) by 0 days.

(21) Appl. No.: 11/349,302

(22) Filed: Feb. 7, 2006

(65) Prior Publication Data
US 2006/0181129 A1    Aug. 17, 2006

(30) Foreign Application Priority Data
Feb. 11, 2005 (DE) .................. 10 2005 006 563
Aug. 20, 2005 (DE) .................. 10 2005 039 540

(51) Int. Cl.
*B60N 2/02* (2006.01)
(52) U.S. Cl. .................. 297/341; 297/378.12
(58) Field of Classification Search ............. 297/341, 297/344.1, 378.12
See application file for complete search history.

(56) References Cited

U.S. PATENT DOCUMENTS

| 5,855,413 | A * | 1/1999 | Couasnon et al. ........... 297/341 |
| 6,036,267 | A * | 3/2000 | Downey et al. ............. 297/341 |
| 6,736,461 | B2 * | 5/2004 | Blair et al. .............. 297/378.12 |
| 7,059,679 | B2 * | 6/2006 | Yamada ................... 297/341 |
| 2003/0080598 | A1 * | 5/2003 | Becker et al. .............. 297/341 |

* cited by examiner

*Primary Examiner*—Milton Nelson, Jr.
(74) *Attorney, Agent, or Firm*—Cantor Colburn LLP

(57) ABSTRACT

The invention relates to a forwardly movable vehicle seat having an underframe including a longitudinal adjusting device, the longitudinal adjusting device including two pairs of rails, two catch devices and one actuation lever for actuating the catch devices. The vehicle seat further includes a seat pan that is carried by the underframe, and a seat back that is pivotal about a seat back axis and on which there is disposed a disengagement lever. In an actuated condition, the seat back is unlocked so as to be foldable, the actuation lever being actuated and the catch devices unlocked and the seat being allowed to be brought from an initial position to a forwardly moved position when the seat back is folded forward.

9 Claims, 4 Drawing Sheets

FORWARDLY MOVABLE VEHICLE SEAT WITH AN UNDERFRAME AND A FORWARDLY FOLDABLE SEAT BACK

TECHNICAL FIELD OF THE INVENTION

The invention relates to a forwardly movable vehicle seat with an underframe comprising a longitudinal adjusting device, said longitudinal adjusting device comprising two pairs of rails, two catch devices united by a transverse bar and an actuation lever connected to said transverse bar for actuating said catch devices, with a seat pan that is carried by the underframe, with a seat back that is pivotal about a seat back hinge associated with a stop device and on which there is disposed a disengagement lever for unlocking the stop device when in the actuated position so that the seat back is foldable, a driver mechanism connecting the seat back to the transverse bar being provided and the catch devices being unlocked and the seat being allowed to be brought from an initial position to a forwardly moved position when the seat back is folded forward.

BACKGROUND OF THE INVENTION

Forwardly movable vehicle seats of this kind are mainly in use in vehicles having but one door on either side. They facilitate access to a back seat while boarding the vehicle through the only side door. When the vehicle seat is moved forward, access to the back seat located behind is facilitated.

Such type vehicle seats have to meet the requirement of being readily and safely forward movable in mechanical terms. This forward movement is initiated by actuating the disengagement lever which releases the normally locked seat back hinge. The then enabled forward tilt of the seat back causes the two catch devices to be released so that the seat may be moved forward within the pairs of rails of the longitudinal adjusting device. If the seat is moved back thereafter, the initial position has to be found again. This is achieved by means of the memory mechanism. Said memory mechanism ensures that the seat is only allowed to move back as far as the initial position.

A forwardly movable vehicle seat of the type mentioned herein above is known from EP 0 844 133 B1. Similar forwardly movable vehicle seats are also known from U.S. Pat. No. 5,893,610, DE 107 597 111 C1 and DE 197 571 110 C1.

The following problem may possibly arise with such type forwardly movable vehicle seats: the catch devices are unlocked both through the pivotal movement of the seat back and through actuation of the actuation lever. Accordingly, two different devices may act upon the catch devices. Problems may arise when, one device having already unlocked the catch devices, the second device is knowingly or unknowingly actuated as well. The objective of the invention is to avoid the disadvantages resulting therefrom. More specifically, the objective of the invention is to avoid damage due to maloperation, in particular to prevent damage to the driver mechanism as a result of maloperation of the actuation lever.

When the seat back is folded forward, the catch devices are unlocked. In order to allow maintaining the catch devices in the unlocked condition, the driver mechanism must remain active, that is, it must for example be under tension. The driver mechanism comprises for example a sheathed cable that may e.g., be configured to be a Bowden cable. If said sheathed cable is tense, such a condition being provided when the seat back is folded forward, and if the actuation lever is pushed at the same time, meaning, is pivoted in a direction counter to the direction in which, when actuated, it is in a normal limit stop position, said sheathed cable is overtensioned. The cable itself, its fastening means or other parts of the driver mechanism may be destroyed thereby. Usually, the actuation lever is located beneath the front edge of a seat, normally it slightly protrudes therefrom. It is connected to the transverse bar through quite long a lever arm. As a result, quite high a force may be exerted onto the transverse bar, and as a result thereof, onto the driver mechanism as well.

BRIEF SUMMARY OF THE INVENTION

This is where the invention comes in. It aims at eliminating the problems arising from improper use and occurring with the prior art vehicle seats and at developing said vehicle seats so that the driver mechanism is prevented from being damaged as a result of improper use.

This object is solved by the forwardly movable vehicle seat having the features of claim 1.

Either the actuation lever and/or the driver mechanism, more specifically their connection to the transverse bar, are configured so that the overload spring yields when overloaded so that mechanical damage to discrete components is prevented from occurring. Overload occurs from maloperation; as far as mechanical maloperation is possible at all, the overload spring absorbs the forces that might otherwise damage the components.

The invention makes it possible to virtually keep to the largest possible extent the original construction of the vehicle seat. It only needs some few additional components. The overload spring has a space-saving configuration and may be disposed so as to occupy very little additional space. The overload spring may also readily be a low-cost spring, for example a torsion spring or a leaf spring.

Generally, the invention provides a load-limiting device using but a few, simple mechanical means, said load-limiting device permitting the vehicle seat to keep functioning even upon maloperation of the actuation lever. The maloperation problems occurring with prior art are considerable, they impair the use of the vehicle seat and require complicated repair work.

The overload spring of the invention causes the driver mechanisms and the actuation lever to separate from each other so that the actuation lever is prevented from acting directly onto the driver mechanism. Now, driver mechanisms and actuation lever are no longer united directly, but merely through an elastic means, namely the overload spring.

The transverse bar unites the two seat rails of the longitudinal adjusting device in a known manner. It synchronizes the actuation of the two catch devices. The actuation lever is disposed on said transverse bar so as to be preferably pivotal and carried by the overload spring.

BRIEF DESCRIPTION OF THE DRAWINGS

Other features and advantages of the invention will become more apparent upon reviewing the appended claims and the following non restrictive description of embodiments of the invention, given by way of example only with reference to the drawing. In said drawing:

DETAILED DESCRIPTION OF THE INVENTION

Figure 1:
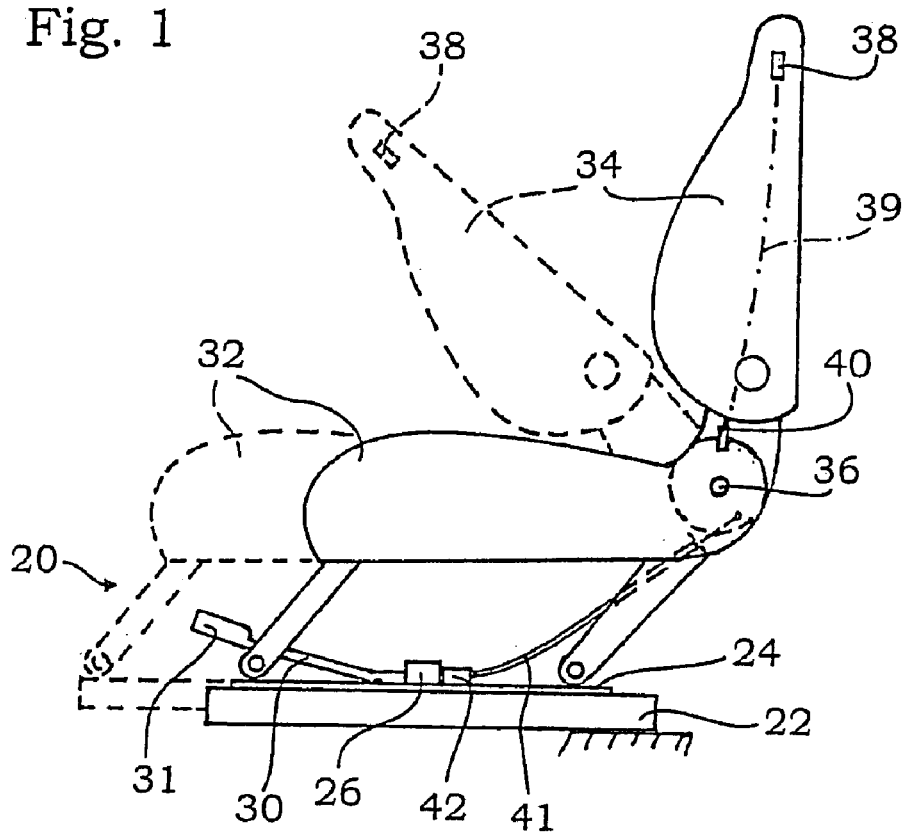
FIG. 1 is a schematic side view of a forwardly movable vehicle seat.

FIG. 1 schematically illustrates a vehicle seat shown in a side view. It is shown in the initial position, which is for example the normal position of utilization, by a continuous line. The forwardly moved position is shown by a dashed line.

Figure 2:
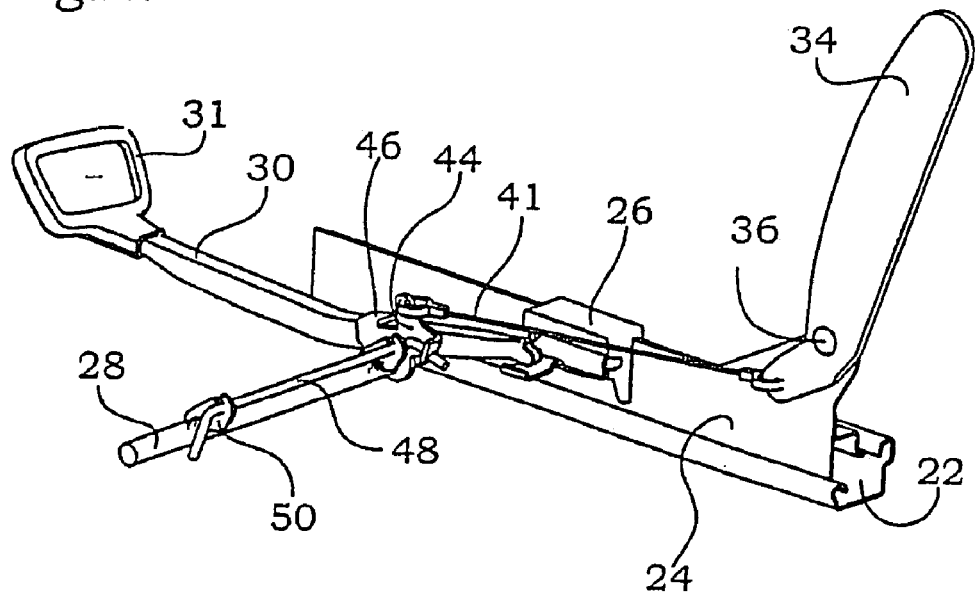
FIG. 2 is a perspective illustration of the main parts of the invention, when viewed obliquely from the top rear side, these parts being a pair of rails with catch device, a transverse bar, an actuation lever and elements of a seat back, with seat back and actuation lever being in the normal position.
Figure 3:
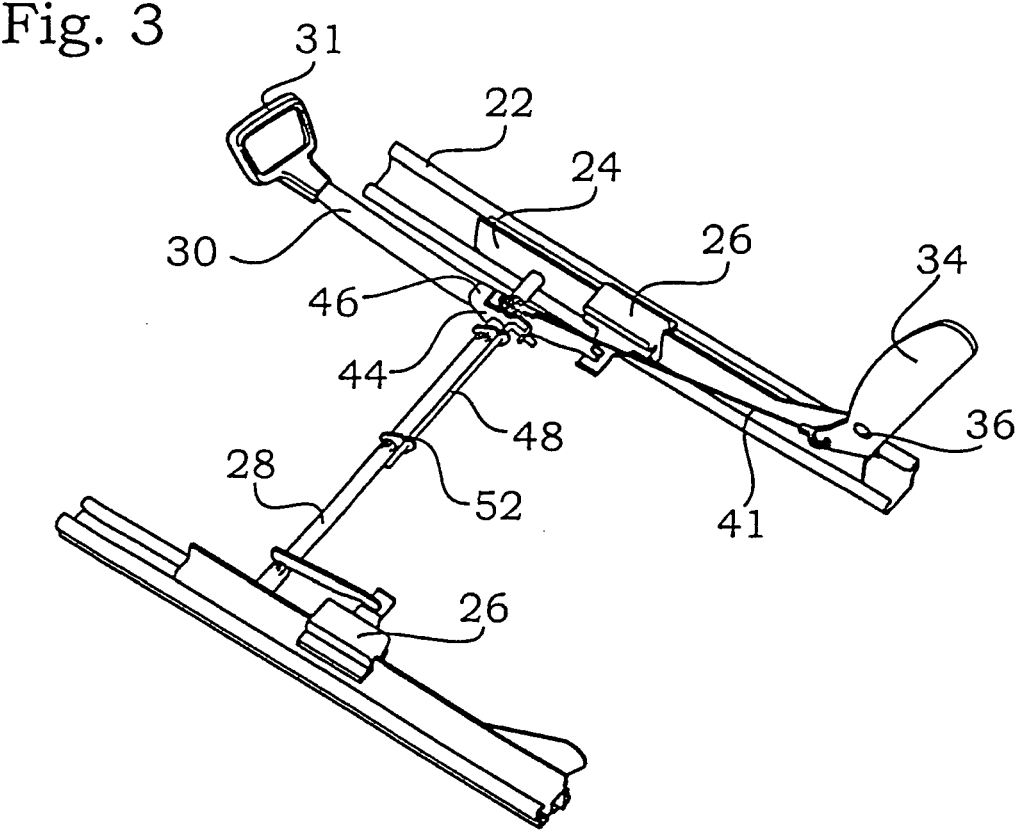
FIG. 3 is a perspective illustration, as seen from the top, of the parts according to FIG. 2, but in addition thereto with a second pair of rails and the associated parts.

The vehicle seat has an underframe 20 that comprises a longitudinal adjusting device. Said adjusting device has a left and a right pair of rails, each comprising a floor rail 22 and a seat rail 24. Said rails are slidable against each other in the longitudinal direction that is, from the left to the right and reverse in the image plane. Normally, the rails 22, 24 are locked, a catch device 26 being associated with each pair of rails. The two catch devices 26 of the seat sides are synchronized together by a transverse bar 28, see FIG. 2, that unites the two seat rails 24 and is rotatable. Said transverse bar 28 is connected to an actuation lever 30 that causes it to pivot, this causing the catch devices 26 to move from the normal catch position to a release position. As best seen in FIG. 3, the actuation lever 30 is located on one seat side, the transverse bar 28 being located between a respective one of the catch devices 26 and a handle 31 of the actuation lever 30. On the other seat side, a short actuation piece is provided only.

The seat further has a seat pan 32 that is carried by the underframe. The seat further has a seat back 34 that is pivotal about a seat back hinge 36. Above the seat back hinge 36, the seat back 34 also has a normal seat back adjusting device that is known per se and is only outlined here. A release lever 38 is disposed on the seat back. It is connected via a connecting means 39 to a stop device 40 that normally locks the seat back hinge 36. Upon actuation of the release lever 38, the stop device 40 is released and the seat back 34 may now be folded forward about the axis of the seat back hinge 36.

The seat back 34 is connected to the transverse bar 28 or rather to the catch devices 26 via a driver mechanism. Said driver mechanism includes a sheathed cable 41 that is connected to the seat back 34 underneath the axis of the pivot hinge 36. Said sheathed cable is tensioned when the seat back 34 is folded forward from the normal position, as shown in FIG. 1. This tensile force is used to unlock the catch devices 26. A memory mechanism 42 is additionally provided; such a memory mechanism is known and will not be discussed herein.

Said driver mechanism further includes a driver lever 44. It is disposed so as to rotatable about the transverse bar 28. One end of the sheathed cable 40 is attached thereon. Said driver lever has an abutment region 46 located on top of the actuation lever 30. As a result thereof, the pivot path of the driver lever is limited in one direction of rotation.

Finally, the driver mechanism has an overload spring 48. In the first embodiment in accordance with the FIGS. 2 through 6, it is configured to be a torsion spring. It has two angled end regions. Two bearing pillows 50, which form a receptacle for the overload spring 48, are fastened to the transverse bar 28. A first end region of the abutment spring 46, which in FIG. 2 is located remote from the driver lever 44, abuts the transverse bar 28. The other end region elastically fits against the driver lever 44 and brings it to fit against the actuation lever 30.

The FIGS. 2 and 3 illustrate the normal initial position with the longitudinal guide being locked by the catch devices 26. In FIG. 3, the seat back 34 is folded forward so that the driver mechanism is now under tension; more specifically, the sheathed cable 41 has been tensioned so as to draw the driver lever 44 backward and slightly nearer to it. The driver lever 44 still abuts the overload spring 48 which is still in the same position. It is sufficiently strong to cause the transverse bar 28 to rotate via the overload spring 48. As a result, the actuation lever 28 is also caused to pivot, its rear actuation arm, which is placed on an actuation tongue of the catch device 26 so as to be free toward the top, being caused to move downward so that the associated catch device 26 is unlocked. The catch device on the other seat side, which is not shown in FIG. 3, undergoes the same procedure.

Figure 4:
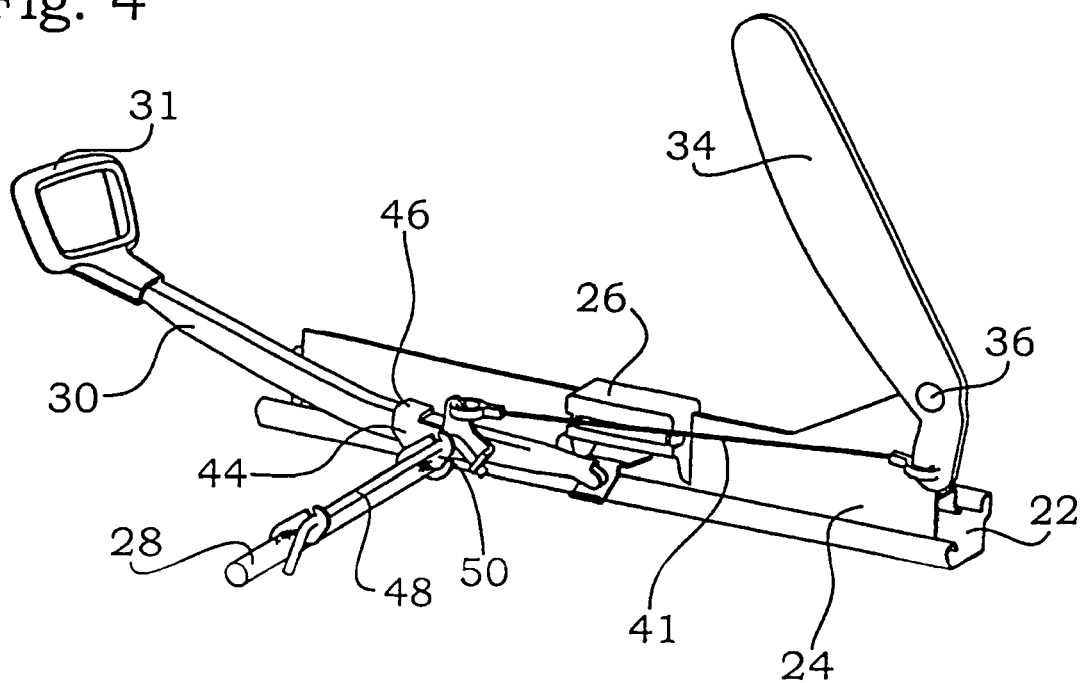
FIG. 4 is a view like FIG. 2 of the same unit, with said unit being now in the actuated position.

The same position of the actuation lever 30 as in FIG. 4 is also achieved if the actuation lever 30 is itself actively actuated. In this case however, the seat back 34 is not pivoted. In this case, the driver mechanism is slack.

It can be seen from FIG. 4 that the overload spring 48 has sufficient force to allow transfer of the pivot movement of the driver lever 44 onto the transverse bar 28 and unlocking of the two catch devices 26 without the overload spring 48 markedly deflecting.

Figure 5:
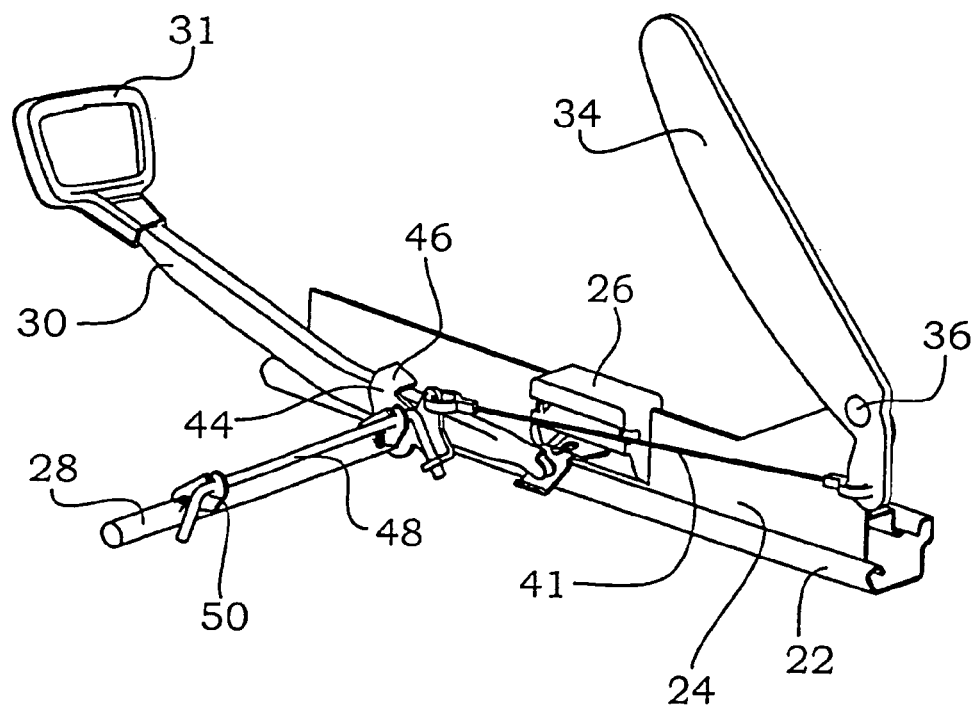
FIG. 5 is the view like FIG. 4, but now in the overtravel position.

FIG. 5 shows what is termed an overtravel condition. This means that the seat back is pushed even further downward than shown in FIG. 1. The driver mechanism is loaded as a result of this larger pivot angle of the seat back 34. Now, the driver lever 44 may pivot against the action of the overload spring 48, said overload spring 48 yields so that breakage or destruction is prevented. From FIG. 5 it can be seen that the overload spring 48 yields when a larger force, more specifically a force at least three times, preferably a force at least five times the force needed to unlock the two catch devices 26, is applied on the driver lever 44.

Figure 6:
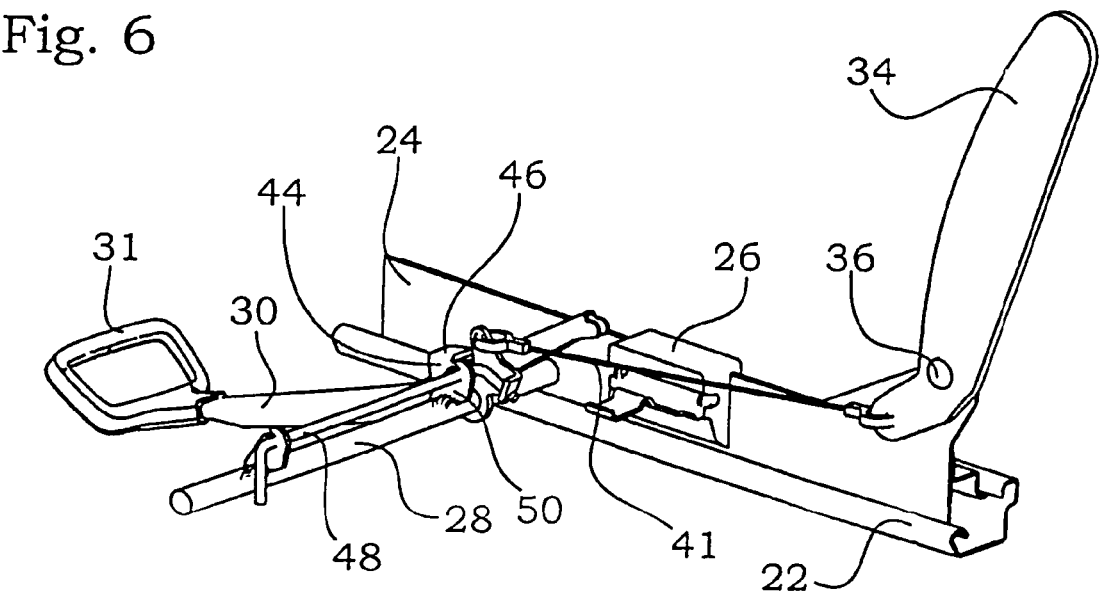
FIG. 6 is an illustration like FIG. 4, but now in the improper use position

Conditions similar to those in FIG. 5 also result from improper use such as shown in FIG. 6. In this case, the actuation lever 30 is improperly pushed downward, which causes the transverse bar 28 to pivot accordingly. The catch devices 26 are unlocked; it appears clearly that the corresponding lever arm of the actuation lever 30 is located far above the actuation tongue of the catch device 26 from which it is completely free.

Improper actuation of the actuation lever 30 however resulted in the driver lever 44 not being pivoted like the transverse bar 28; instead, it lags behind said transverse bar 28. This could happen because the overload spring 48 has yielded. Thus, damage of part of the driver mechanism could be avoided.

Figure 7:
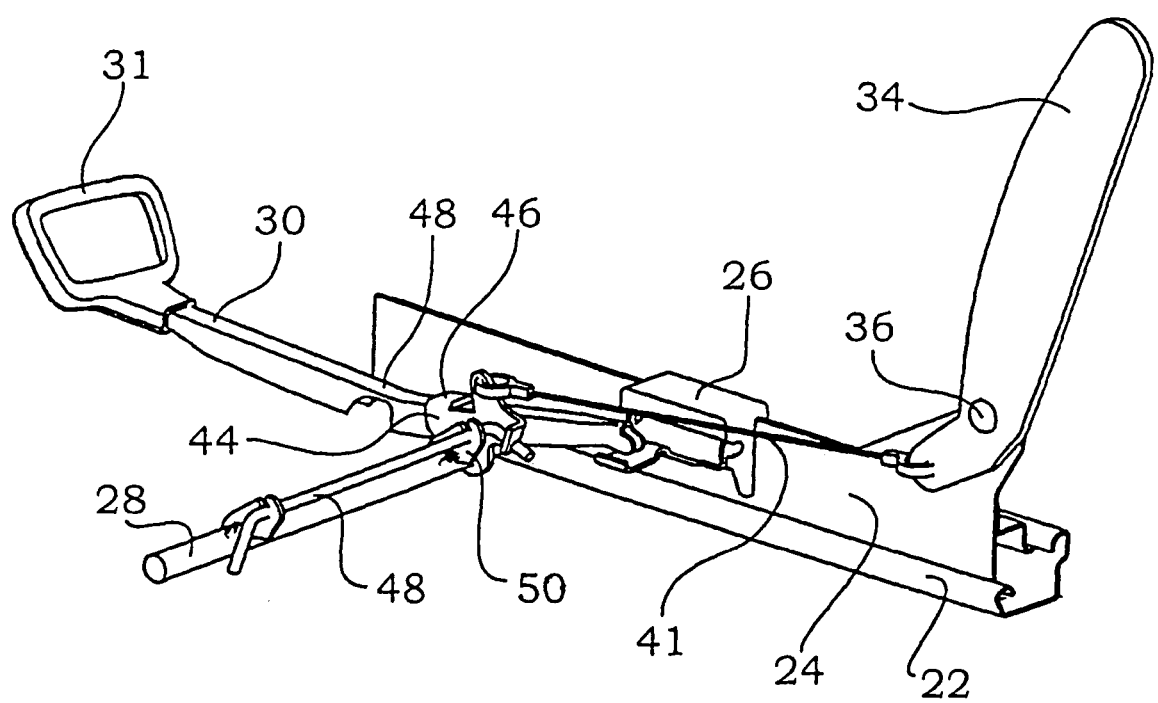
FIG. 7 is an illustration like FIG. 2, with an overload spring having been added in the actuation lever.

A second embodiment is shown in FIG. 7. In this FIG. the arrangement with the overload spring 48 in the form of a torsion spring according to the embodiments shown in the FIGS. 2 through 6 is shown again; the actuation lever 30 however has been modified with a short region being now realized by an overload spring 48 in the form of a leaf spring. Said overload spring 48 is also dimensioned such that normal actuation of the catch devices 26 is possible, an actuation force causing the lever to go beyond this normal actuation position, which may cause damage to the driver mechanism, being impaired, though. When such a force is applied, the leaf spring 48 constituting the overload spring flexes instead.

It cannot be seen from the FIGS. that the actuation lever 30 only has a certain range of motion due to the space available for mounting said lever in an automotive vehicle. The respective overload spring 48 only has to be configured for this range of motion.

In the embodiment according to FIG. 7, the overload spring 48 in the form of a torsion spring may be obviated. Then, the driver lever 44 can be rigidly connected to the transverse bar 28. Improper use of the actuation lever 30 will not cause the driver mechanism to be destroyed as the overload spring 48 configured to be a leaf spring will flex soon enough to prevent destruction thereof.

The invention claimed is:

1. A forwardly movable vehicle seat
with an underframe comprising a longitudinal adjusting device, said longitudinal adjusting device comprising two pairs of rails, two catch devices united by a transverse bar and an actuation lever connected to said transverse bar for actuating said catch devices,
with a seat pan that is carried by the underframe,
with a seat back that is pivotal about a seat back hinge associated with a stop device and on which there is disposed a disengagement lever for unlocking the stop device when in an actuated position so that said seat back is foldable, a driver mechanism connecting said seat back to said transverse bar being provided and said catch devices being unlocked and the seat being allowed to be brought from an initial position to a forwardly moved position when said seat back is folded forward,
wherein said driver mechanism comprises a driver lever that is disposed on the transverse bar, an overload spring is provided, said overload spring is on one side sufficiently rigid to allow sufficient large a force to be transferred for actuating the catch devices but on another side sufficiently compliant so as to yield upon actuation of the actuation lever before the driver mechanism gets damaged and said overload spring is disposed a) either between said transverse bar and said driver lever or b) between the handle of the actuation lever and said transverse bar.

2. Forwardly movable vehicle seat as set forth in claim 1, wherein the overload spring is a leaf spring.

3. Forwardly movable vehicle seat as set forth in claim 1, wherein the overload spring is a torsion spring.

4. Forwardly movable vehicle seat as set forth in claim 1, wherein an arm is provided on the overload spring, said arm forming the driver lever and wherein said arm is formed integral with said overload spring.

5. Forwardly movable vehicle seat as set forth in claim 1, wherein the driver lever is pivotally disposed on the transverse bar.

6. Forwardly movable vehicle seat as set forth in claim 1, wherein the overload spring abuts the transverse bar at one end region.

7. Forwardly movable vehicle seat as set forth in claim 1, wherein the driver lever comprises an abutment region and said abutment region fits against the actuation lever.

8. Forwardly movable vehicle seat as set forth in claim 1, wherein the driver lever is pivotally disposed on the transverse bar, the overload spring elastically biases said driver lever in one direction of rotation, said driver lever comprises an abutment region and said abutment region fits against the actuation lever.

9. Forwardly movable vehicle seat as set forth in claim 1, wherein the overload spring comprises a force that is at least three times a force applied to the overload spring when the catch devices are being unlocked.

* * * * *